United States Patent
Somanath

(10) Patent No.: US 11,546,734 B2
(45) Date of Patent: Jan. 3, 2023

(54) PROVIDING SECURITY VIA VEHICLE-BASED SURVEILLANCE OF NEIGHBORING VEHICLES

(71) Applicant: Ford Global Technologies, LLC, Dearborn, MI (US)

(72) Inventor: Nithya Somanath, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 46 days.

(21) Appl. No.: 17/321,573

(22) Filed: May 17, 2021

(65) Prior Publication Data
US 2022/0369066 A1    Nov. 17, 2022

(51) Int. Cl.
| | | |
|---|---|---|
| *H04W 4/02* | (2018.01) |
| *H04W 4/029* | (2018.01) |
| *H04W 4/46* | (2018.01) |
| *H04W 4/024* | (2018.01) |
| *H04W 4/021* | (2018.01) |
| *H04N 7/18* | (2006.01) |
| *G06V 20/56* | (2022.01) |

(52) U.S. Cl.
CPC ............ *H04W 4/029* (2018.02); *G06V 20/56* (2022.01); *H04N 7/183* (2013.01); *H04W 4/021* (2013.01); *H04W 4/024* (2018.02); *H04W 4/46* (2018.02)

(58) Field of Classification Search
CPC ..... H04W 4/029; H04W 4/021; H04W 4/024; H04W 4/46; G06V 20/56; H04N 7/183
See application file for complete search history.

(56) References Cited

U.S. PATENT DOCUMENTS

| | | | |
|---|---|---|---|
| 9,162,606 B2 | 10/2015 | Kesavan et al. |
| 10,026,309 B1 | 7/2018 | Nepomuceno et al. |
| 10,178,890 B1* | 1/2019 | Andon | G01S 5/0027 |
| 10,347,128 B1* | 7/2019 | Edwards | G08G 1/166 |
| 10,354,386 B1* | 7/2019 | Farnsworth | H04N 7/185 |
| 10,386,849 B2* | 8/2019 | Lee | G06T 7/70 |
| 10,497,232 B1* | 12/2019 | Koskan | G08B 13/189 |

(Continued)

OTHER PUBLICATIONS

I. D. Markwood et al. "Vehicle Self-Surveillance: Sensor-Enabled Automatic Driver Recognition" (May 2016).

(Continued)

*Primary Examiner* — James R Sheleheda
*Assistant Examiner* — Timothy R Newlin
(74) *Attorney, Agent, or Firm* — Brandon Hicks; Eversheds Sutherland (US) LLP

(57) ABSTRACT

Systems and methods to provide security to an occupant of a first vehicle. In an example method, a computer provided in the first vehicle establishes a geofence that surrounds the first vehicle. The computer may detect a second vehicle that is present inside the geofence at one or more times and may react to the detection by obtaining data that provides information about an identity of the second vehicle. In one scenario, the data may be obtained via vehicle-to-vehicle communication between the first vehicle and the second vehicle. The computer may evaluate the data to identify a driver of the second vehicle and to confirm that the second vehicle is carrying out a stalking operation and may pose a security threat. The computer may then automatically contact a police officer to report the security threat.

10 Claims, 7 Drawing Sheets

(56) References Cited

U.S. PATENT DOCUMENTS

| | | | |
|---|---|---|---|
| 10,743,159 B2 | 8/2020 | Ameixieira | |
| 10,789,493 B1* | 9/2020 | Rocci | H04W 4/46 |
| 2003/0112133 A1* | 6/2003 | Webb | G08G 1/162 |
| | | | 340/436 |
| 2011/0052042 A1* | 3/2011 | Ben Tzvi | G06T 19/006 |
| | | | 382/154 |
| 2013/0203400 A1* | 8/2013 | Ricci | G06F 11/2025 |
| | | | 455/418 |
| 2014/0012494 A1* | 1/2014 | Cudak | G01C 21/3415 |
| | | | 701/465 |
| 2015/0002671 A1* | 1/2015 | Hayakawa | G06V 20/58 |
| | | | 348/148 |
| 2015/0022663 A1* | 1/2015 | Wang | G08B 13/19602 |
| | | | 348/148 |
| 2015/0120183 A1* | 4/2015 | Annapureddy | G01C 21/3688 |
| | | | 701/430 |
| 2016/0225410 A1* | 8/2016 | Lee | H04N 21/21805 |
| 2017/0263120 A1* | 9/2017 | Durie, Jr. | G08G 1/205 |
| 2017/0359365 A1* | 12/2017 | van den Berg | H04W 4/20 |
| 2018/0074495 A1* | 3/2018 | Myers | E05B 81/54 |
| 2018/0075754 A1* | 3/2018 | Salter | H04W 4/023 |
| 2018/0091940 A1* | 3/2018 | Gonzalez | G01C 21/3697 |
| 2019/0063941 A1* | 2/2019 | Walenty | G01C 21/362 |
| 2019/0077398 A1* | 3/2019 | Kusano | G06V 20/58 |
| 2019/0213425 A1* | 7/2019 | Anderson | G08G 1/0112 |
| 2019/0230467 A1* | 7/2019 | Williams | H04L 67/306 |
| 2019/0279508 A1* | 9/2019 | Wang | H04W 4/46 |
| 2019/0354774 A1* | 11/2019 | Leizerovich | G08B 13/19695 |
| 2019/0354776 A1* | 11/2019 | Ribeiro | H04N 5/2253 |
| 2020/0019926 A1* | 1/2020 | Ayoub | G06Q 10/083 |
| 2020/0097007 A1* | 3/2020 | Dyer | G08G 1/0145 |
| 2020/0101980 A1* | 4/2020 | Adams | G08G 1/096725 |
| 2020/0168080 A1* | 5/2020 | Kim | B60W 30/18 |
| 2020/0344820 A1* | 10/2020 | Fowe | H04W 4/46 |
| 2020/0387992 A1* | 12/2020 | Vij | G06K 7/10722 |
| 2020/0389760 A1* | 12/2020 | Ghannam | H04W 4/80 |
| 2021/0009164 A1* | 1/2021 | Ito | B60W 60/0027 |
| 2021/0029510 A1* | 1/2021 | Arai | H04W 4/021 |
| 2021/0065551 A1* | 3/2021 | Manohar | B60Q 9/008 |
| 2021/0097788 A1* | 4/2021 | Woo | H04N 5/23206 |
| 2021/0103747 A1* | 4/2021 | Moustafa | G06V 20/584 |
| 2021/0112368 A1* | 4/2021 | Whelen | H04W 4/46 |
| 2021/0217308 A1* | 7/2021 | Tehrani | G06N 3/088 |
| 2021/0291871 A1* | 9/2021 | Yoshida | B60W 50/0205 |
| 2021/0300418 A1* | 9/2021 | Alvarez | G08G 1/161 |

OTHER PUBLICATIONS

C. Oh et al. "Capability-Enhanced Probe Vehicle Surveillance System With Vehicle-to-Vehicle Communications: Framework and Evaluation" (Jan. 2010).

* cited by examiner

PROVIDING SECURITY VIA VEHICLE-BASED SURVEILLANCE OF NEIGHBORING VEHICLES

BACKGROUND

A person with illicit intent often carries out a reconnaissance operation before executing a crime. In some cases, the person may track the movements of a potential target, such as when the target is heading home or going to a bank to make a deposit, in order to find out whether the target is carrying any valuables. Tracking the movements of the target may involve following a vehicle driven by the target. The target may notice that his/her vehicle is being followed by a suspicious looking vehicle and may lodge a complaint with the authorities, such as the police. The police may inform the target that no tangible action can be taken against the person at this time because no crime had been committed. In some cases, the police may respond to the target's notification and pull over the suspicious looking vehicle only to discover that the driver of the suspicious looking vehicle is an innocent individual who merely happens to be traveling along the same travel route as the complainant.

It is therefore desirable to provide a solution to address the issue described above.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION

Overview

Figure 1:
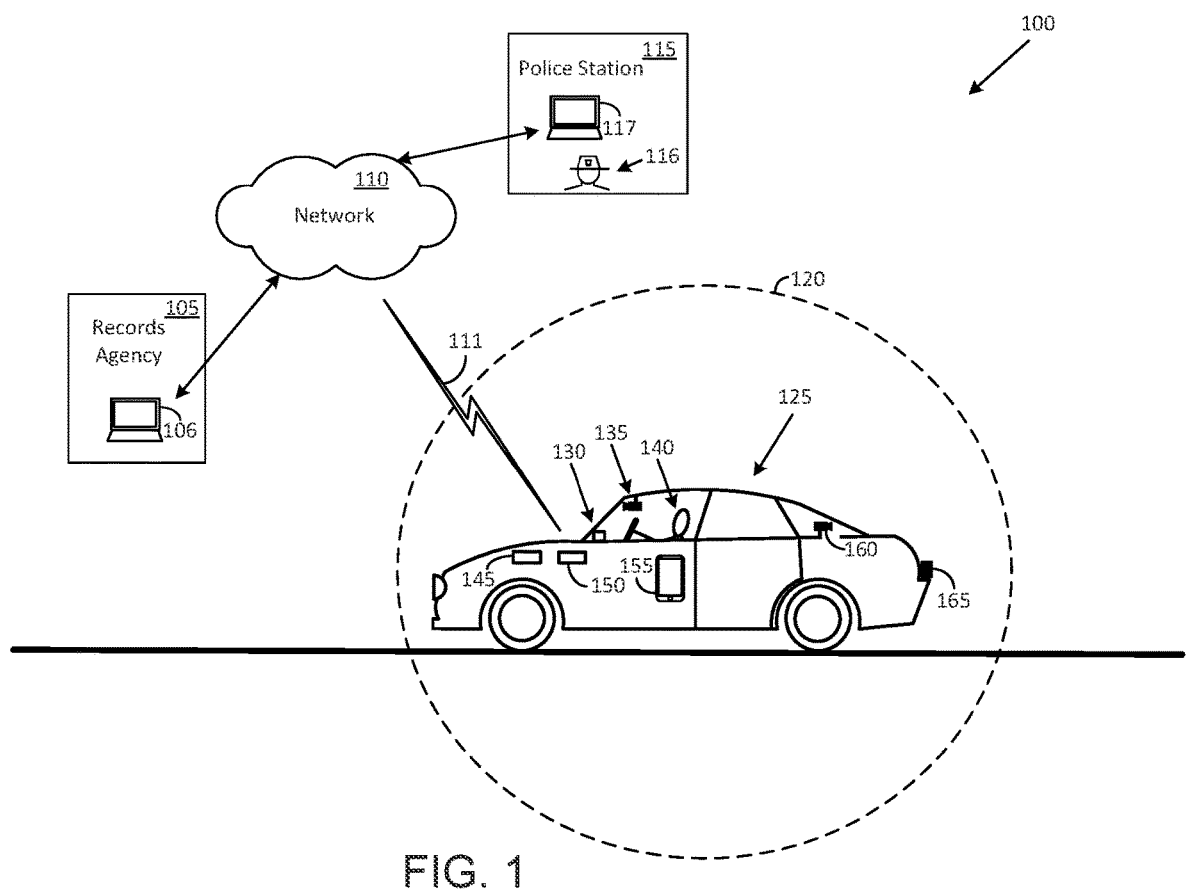
FIG. 1 shows an example system that includes a first vehicle configured to perform surveillance of neighboring vehicles in accordance with an embodiment of the disclosure.

In terms of a general overview, certain embodiments described in this disclosure are directed to systems and methods to provide security to an occupant of a first vehicle upon detecting a second vehicle shadowing the first vehicle. In an example method, a computer provided in the first vehicle establishes a geofence that surrounds the first vehicle. The computer may then detect the second vehicle present inside the geofence at one or more times. The computer responds to the detection by obtaining information about an identity of the second vehicle. In one scenario, the information may be contained in data that is obtained via vehicle-to-vehicle communication between the first vehicle and the second vehicle or over a network. The computer may evaluate the data to identify the second vehicle and to confirm that the second vehicle is carrying out a stalking operation and may pose a security threat to the occupant of the first vehicle. The computer may then automatically contact an authority, such as a police officer, to report the security threat.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the above-described example embodiments but should be defined only in accordance with the following claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure. For example, any of the functionality described with respect to a particular device or component may be performed by another device or component. Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "vehicle" as used herein encompasses various types of vehicles such as, for example, a car, a truck, a van, a sports utility vehicle (SUV), and a bus. Words such as "wireless" or "wirelessly" as used herein are not intended to preclude other forms of communication such as optical communications and wired communications. The examples provided herein encompass such alternative communication technologies. Word such as "stalking" and "shadowing" generally refer to nefarious operations that may lead to security issues. Furthermore, it should be understood that the word "example" as used herein is intended to be non-exclusionary and non-limiting in nature.

FIG. 1 shows an example system 100 that includes a vehicle 125 configured to perform surveillance of neighboring vehicles in accordance with an embodiment of the disclosure. The vehicle 125 may be any of various types of vehicles that include components such as, for example, a vehicle systems controller 145, an infotainment system 130, a security computer 150, and various sensors and detection devices that are communicatively coupled to the security computer 150 and/or the vehicle systems controller 145. In an example implementation, the sensors and detection devices may be arranged to capture information about objects outside the vehicle 125 such as, for example, other vehicles that may be present in the vicinity of the vehicle 125.

The vehicle systems controller 145 may perform various functions such as controlling engine operations (fuel injection, speed control, emissions control, braking, etc.), managing climate controls (air conditioning, heating etc.), activating airbags, and issuing warnings (check engine light, bulb failure, low tire pressure, vehicle in blind spot, etc.). In some embodiments, the vehicle systems controller 145 may replace, supplement, or complement the security computer 150.

The security computer 150 may execute various functions associated with providing security to an occupant of the vehicle 125 (including a driver 140) and may be communicatively coupled to the vehicle systems controller 145 and the infotainment system 130 via wired and/or wireless connections. In one implementation, the security computer 150 may be communicatively coupled to the vehicle systems controller 145 and the infotainment system 130 via a vehicle bus that uses a controller area network (CAN) bus protocol, a Media Oriented Systems Transport (MOST) bus protocol, and/or a CAN flexible data (CAN-FD) bus protocol. In another implementation, the communications may be provided via wireless technologies such as Bluetooth®, Ultra-Wideband, Wi-Fi, Zigbee®, or near-field-communications (NFC).

In an exemplary embodiment, the infotainment system 130 includes a graphical user interface (GUI) or a human machine interface (HMI) that can be used to accept input from the driver 140 of the vehicle 125, and/or to display items such as messages, icons, and/or soft keys. An example message may pertain to an alert or a warning regarding a security threat posed by another vehicle (not shown) that may be shadowing the vehicle 125.

The security computer 150 may also be communicatively coupled via a network 110 to various computers associated with various entities, such as, for example a computer 106 of the records agency 105 and a computer 117 of a police station 115. The computer 106 of the records agency 105 may contain identification information such as, for example, vehicle identification numbers of vehicles that have been registered with government agencies. The computer 117 in the police station 115 may be monitored by a police officer 116 for incoming messages and help requests.

The network 110 may include any one, or a combination of networks, such as a local area network (LAN), a wide area network (WAN), a telephone network, a cellular network, a cable network, a wireless network, and/or private/public networks such as the Internet. For example, the network 110 may support communication technologies such as Wi-Fi, Wi-Fi direct, Ultra-Wideband (UBW), machine-to-machine communication, and/or man-to-machine communication.

At least one portion of the network 110 includes a wireless communication link 111 that allows the security computer 150 to communicate with the computer 106 of the records agency 105 and/or the computer 117 located in the police station 115. The wireless communication link 111 may also allow the computer 106 of the records agency 105 and/or the computer 117 located in the police station 115 to communicate with a personal communication device 155 carried by the driver 140 of the vehicle 125 and/or the infotainment system 130 of the vehicle 125. The personal communication device 155 can be any of various devices such as, for example, a smartphone, a tablet computer, a phablet (phone plus tablet), or a laptop computer.

The vehicle 125 may include various sensors and detection devices that are communicatively coupled to the security computer 150 and/or the vehicle systems controller 145. A few examples of such sensors and detection devices may include a camera, an ultrasonic sensor, a radar sensor, GPS, an infrared detector, and/or a light detection and ranging (LIDAR) device. In the illustrated example implementation, the detection devices include a camera 135 and a camera 160. The camera 135 can be a dashcam that is mounted above a dashboard of the vehicle 125 and arranged to capture images of objects located in front of the vehicle 125. The camera 160 may be mounted on a rear bumper of the vehicle 125 and arranged to capture images of objects located behind the vehicle 125. More particularly, the camera 160 is arranged to capture images of vehicles following the vehicle 125. The camera 160 and/or the camera 135 can be a digital camera that captures digital pictures or a video camera that captures video clips or produces streaming video. In some applications the camera 160 and/or the camera 135 can be a night-vision camera that captures images and/or video in low light conditions.

In lieu of, or in addition to, the camera 160, an ultrasonic sensor 165 may be mounted on the rear bumper of the vehicle 125 or on the trunk of the vehicle 125. The ultrasonic sensor 165 uses ultrasonic signals to detect objects located behind the vehicle 125. The ultrasonic sensor 165 can be used day or night for detection purposes and in one case, may be coupled to the camera 160 for capturing images of a vehicle that may be shadowing the vehicle 125.

In an example method of operation in accordance with the disclosure, the security computer 150 may define a geofence 120 around the vehicle 125. The geofence 120 is a dynamic geofence that moves along with the vehicle 125 and is shaped in the form of a circle in this example implementation. In other implementations, the geofence 120 can have various other shapes such as, for example, an oval shape, a rectangular shape, a polygonal shape, or an irregular shape. The shapes can extend in various directions with respect to the vehicle 125 such as, for example, an elongated shape that extends to a greater distance behind the vehicle 125 than towards the front of the vehicle 125.

The dimensions of the geofence 120 may be defined by various entities such as, for example, the driver 140 of the vehicle 125, a manufacturer of the vehicle 125, or a dealership that sells the vehicle 125. In an example scenario, the driver 140 of the vehicle 125 may specify a dimension of the geofence 120 via the GUI of the infotainment system 130. The dimension may be defined, for example, on the basis of a personal comfort level of the driver 140. In one case, the driver 140 may specify the dimension on the basis of a single vehicle-to-vehicle separation distance between the vehicle 125 and another vehicle that may be following the vehicle 125. In another case, the driver 140 may specify the dimension on the basis of a multi vehicle-to-vehicle separation distance. The multi vehicle-to-vehicle separation distance can correspond to a separation distance between the vehicle 125 and another vehicle that is attempting to stalk the vehicle 125 by hiding behind an intervening vehicle. In another example scenario, a dimension of the geofence 120 may be defined on the basis of an operating range of a detection device such as, for example, the ultrasonic sensor 165 or a LIDAR device. The security computer 150 may use the input provided via the GUI of the infotainment system 130 and/or based on operating parameters of one or more detection devices to define, implement, and maintain the geofence 120.

Figure 2:
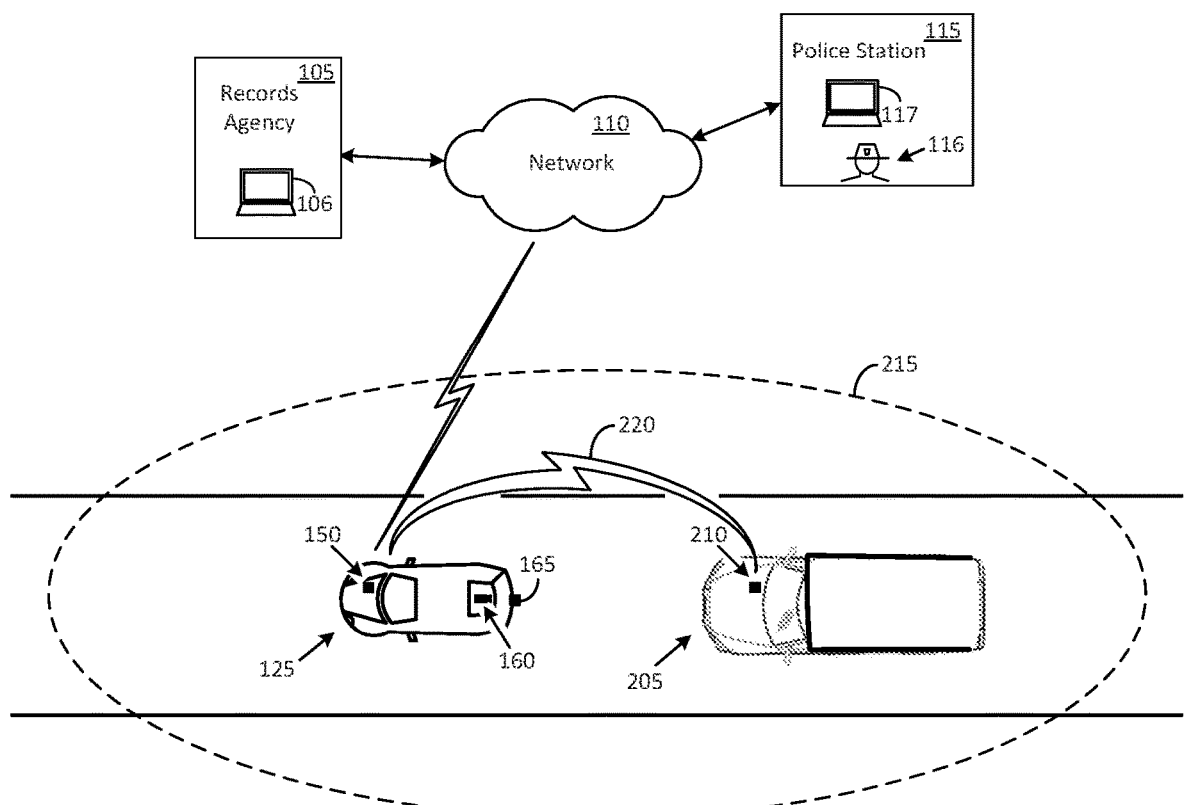
FIG. 2 illustrates a first example scenario where the first vehicle detects the presence of a second vehicle inside a geofence that has been defined by a security computer of the first vehicle.

FIG. 2 illustrates an example scenario where the vehicle 125 detects the presence of a vehicle 205 inside an example geofence 215 that has been defined by the security computer 150 of the vehicle 125. The geofence 215 has an elongated shape that extends to a greater distance behind the vehicle 125 than towards the front of the vehicle 125. In an example sequence of events, the ultrasonic sensor 165 may detect the vehicle 205 and transmit a trigger signal to the camera 160 to capture an image and/or a video clip of the vehicle 205. The image and/or a video clip may be propagated by the camera 160 to the security computer 150. In another implementation, the driver 140 may initiate image capture by the camera 160 upon watching the vehicle 205 in his/her rear-view mirror and becoming suspicious. In yet another implementation the vehicle 125 may request any other vehicle that may be present inside the geofence 215 to share their unique ID and/or geolocation information.

The security computer 150 may evaluate the images and/or video clip captured by the camera 160 to determine whether the vehicle 205 is stalking the vehicle 125. In an example procedure for evaluating the images and/or video clip, the security computer 150 may evaluate images (and/or video clips) that have been previously stored in a memory of the security computer 150 in order to determine whether the vehicle 205 is present in any of the previously stored images. If present, the security computer 150 may evaluate timing information and location information associated with the previously stored images in comparison to the currently captured images so as to identify a behavioral pattern of the vehicle 205. In another example procedure, the security computer 150 may obtain information in real time from the cloud (via the network 110). In one case, the information can include an evaluation and/or analysis of the actions being carried out by the vehicle 205

In an example scenario, the evaluation may indicate to the security computer 150 that the behavioral pattern of the vehicle 205 appears suspicious. Consequently, the security computer 150 may perform one or more actions to confirm that the vehicle 205 is carrying out a stalking operation and may pose a security threat to an occupant of the vehicle 125 (such as, the driver 140). An example action involves the security computer 150 establishing communications with a computer 210 of the vehicle 205 via, for example, a vehicle-to-vehicle (V2V) wireless communication link 220. Upon establishing communications, the security computer 150 may request, and receive, from the computer 210, information about an identity of the vehicle 205, such as, for example, a vehicle identification number (VIN).

The security computer 150 may determine if the VIN number of the vehicle 205 matches any of a set of VIN numbers that may be stored in the memory of the security computer 150 on the basis of previous encounters with the vehicle 205, or as a part of a vehicle directory. In an example scenario, a match may be found. An evaluation of the matched VIN number stored in the memory may indicate that the vehicle 205 belongs to a person known to the driver 140 of the vehicle 125 and poses no security threat. The person driving the trailing vehicle 205 may, for example, be a family member of the driver 140, a neighbor, or a colleague following an identical route to a work place.

In another example scenario, the evaluation of the matched VIN number stored in the memory may indicate that the VIN number has been tagged as a hostile entity. If so, the security computer 150 may automatically communicate with the computer 117 in the police station 115 to alert the police officer 116 of a security threat posed by the vehicle 205. The communication sent to the computer 117 may take various forms such as, for example, in the form of a request for a police vehicle to be dispatched to a current location of the vehicle 125, or in the form of a formal complaint. In another implementation, the communication sent to the computer 117 may include an image of the vehicle 205, a video clip of the vehicle 205 following the vehicle 125, and/or a real-time video of the vehicle 205 following the vehicle 125. In some cases, the security computer 150 may propagate the image or video to the network 110 for cloud storage and access by various entities in addition to the police officer 116 such as, for example, a friend or a family member.

The security computer 150 may then inform the driver 140 of the vehicle 125 (via the infotainment system 130 and/or the personal communication device 155) of the communication having been sent to the computer 117 in the police station 115. The driver 140 may opt to cancel the alert sent out by the security computer 150 or may watch out for the arrival of a police vehicle. In some cases, the police officer 116 may contact the driver 140 via the personal communication device 155 to advise the driver 140 of an action plan to be followed, such as, for example, to drive to the police station 115 or to a rendezvous location with a police vehicle.

In yet another example scenario, no matches may exist between the VIN number of the vehicle 205 and the VIN numbers stored in the memory of the security computer 150. The security computer 150 may then attempt to obtain information about the vehicle 205 from other sources such as, for example, by communicating with the computer 106 of the records agency 105. The computer 106 may contain information such as, for example, ownership information and address of an owner of the trailing vehicle 205. The driver 140 of the vehicle 125 may fail to recognize the owner of the vehicle 205 and may therefore tag the VIN number of the vehicle 205 (and the associated information) as a potentially unfriendly entity. In one case, the VIN number and/or other information about the vehicle 205 may be stored in the memory of the security computer 150 for future reference if the vehicle 205 is observed to be following the vehicle 205 at a subsequent instant in time (later in the day, following day, following week, etc.).

In another case, the driver 140 may confirm his/her suspicion about the vehicle 205 by executing some driving maneuvers such as, for example, turning into multiple side roads, pulling into a parking lot, and/or trying to lose the vehicle 205 at a traffic light. If the vehicle 205 exhibits a stalking behavior during the driving maneuvers, the driver 140 may place a call via his/her personal communications device 155 to the police station 115 and/or may depress a panic button in the vehicle 125 to trigger the security computer 150 to contact the police officer 116 via the computer 117.

Figure 3:
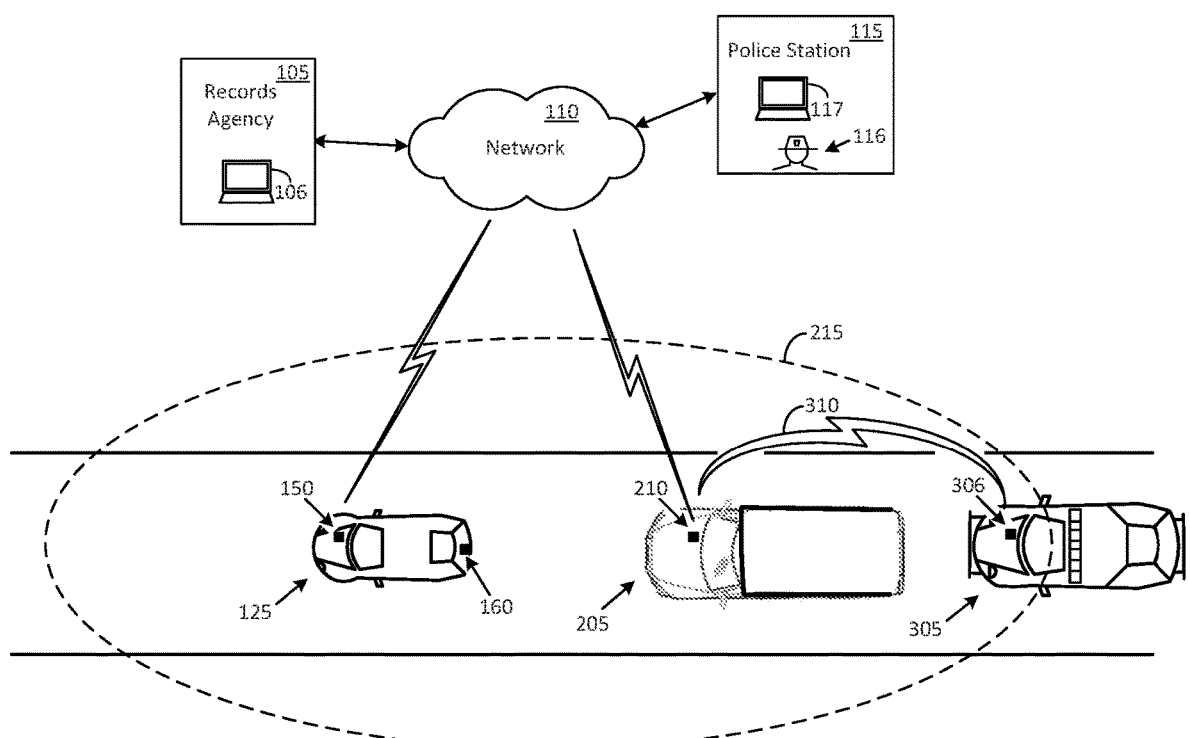
FIG. 3 illustrates a second example scenario where a police vehicle arrives in response to a notification by the first vehicle about a security threat that may be posed by the second vehicle shown in FIG. 2.

FIG. 3 illustrates an example scenario where a police vehicle 305 arrives in response to a notification by the security computer 150 of the vehicle 125 about a security threat that may be posed by the vehicle 205. The police vehicle 305 may approach the vehicle 205 from behind and may execute wireless communications (via a V2V communication link 310) between a computer 306 of the police vehicle 305 and the computer 210 of the vehicle 205. The communications may be directed at obtaining information about the vehicle 205 (for example, a VIN number) and using the information to check vehicle ownership information. The vehicle ownership information may then be used by a police officer in the police vehicle 305 to look up police records, if any, of the owner of the vehicle 205. If a police record exists, the police officer in the police vehicle 305 may pull over the vehicle 205 and proceed with actions such as questioning, warning, and/or arresting the driver of the vehicle 205.

In some cases, the driver of the vehicle 205 may not have a police record. In such cases, the police officer in the police vehicle 305 may pull over the vehicle 205 and question the driver so as to investigate the suspicious behavior of the driver. Additional action may then be taken if warranted.

Figure 4:
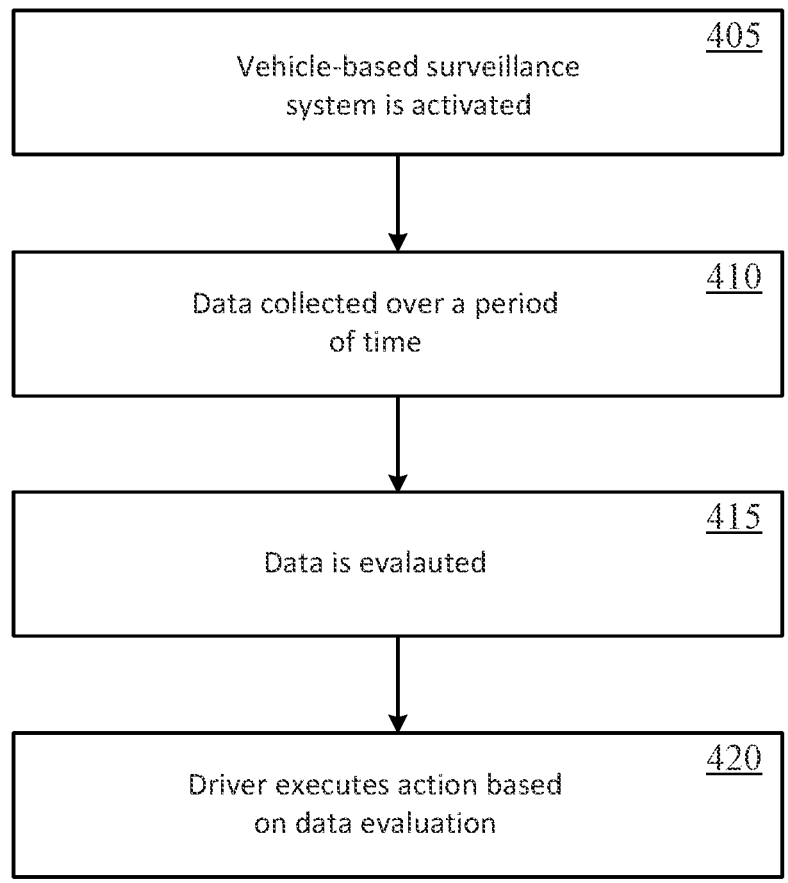
FIG. 4 illustrates a first set of example actions that may be performed to provide security to a driver of a vehicle in accordance with an embodiment of the disclosure.

FIG. 4 illustrates a first set of example actions that may be performed to provide security to the driver 140 of the vehicle 125. At block 405, a vehicle-based surveillance system in the vehicle 125 may be activated. In an example scenario, the vehicle-based surveillance system, which includes the security computer 150 and the various detecting devices, may be activated by the driver 140 via a GUI of the infotainment system 130. In another example scenario, the vehicle-based surveillance system may be activated by the driver 140 via the personal communication device 155 of the driver 140 or may be activated via a personal communication device of another individual (a parent of the driver 140, for example). In yet another example scenario, the vehicle-based surveillance system may be automatically activated whenever the vehicle 125 is started.

At block 410, the vehicle-based surveillance system collects surveillance data over a period of time. For example, the vehicle-based surveillance system may capture images over a period of time (a week or a month, for example, or any period specified by an individual, such as, for example, the driver 140).

At block 415, the surveillance data (images, for example) is evaluated. The evaluation may be carried out by one or more of various computers, and at various times, such as, for example, on a real time basis, on a repetitive basis, on a periodic basis, and/or on as as-needed basis. In an example implementation, the surveillance data may be collected and evaluated on the basis of a machine learning model by the security computer 150 and/or by the computer 117 at the police station 115.

At block 420, the driver 140 may execute an action based on the data evaluation. In an example scenario, the evaluation of the surveillance data may indicate that the driver of the vehicle 205 is a known entity to the driver 140 of the vehicle 125, such as, for example, a neighbor, child, or a colleague. The vehicle-based surveillance system may display details of the driver of the other vehicle 205 on a display screen of the infotainment system 130. The driver 140 may read the displayed information and determine that the driver of the other vehicle 205 poses no security threat. The driver 140 may then input this information into the security computer 150. In an example implementation, the driver 140 may input the information by using the GUI of the infotainment system 130. The security computer 150 may tag the vehicle 205 and/or the driver of the other vehicle 205 as a friendly entity. The tagged information may be stored in a database of the security computer 150 for future use. In another example implementation, the driver 140 of the vehicle 125 may read the displayed information and determine that the driver of the vehicle 205 does indeed pose a security threat. In this situation, the driver 140 may trigger an alert or a request for help (by pressing a panic button in the vehicle 125, for example) so as to send a communication from the security computer 150 to the computer 117 at the police station 115.

Figure 5:
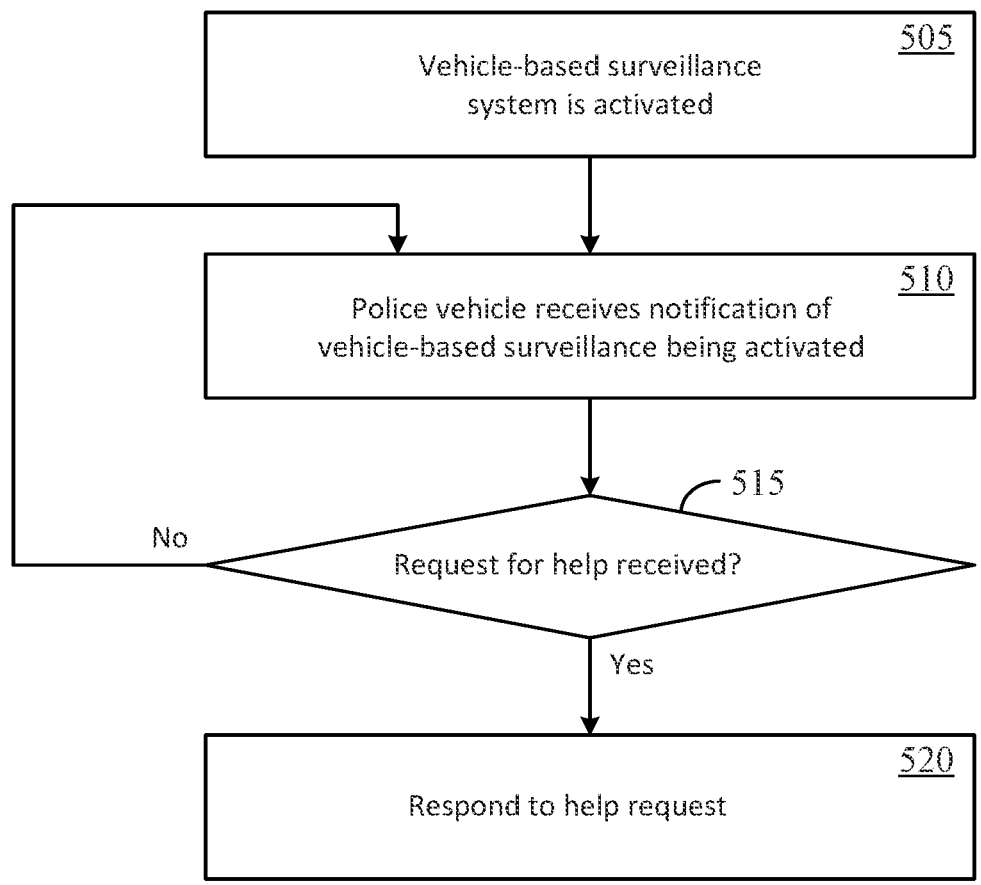
FIG. 5 illustrates a second set of example actions that may be performed to provide security to a driver of a vehicle in accordance with an embodiment of the disclosure.

FIG. 5 illustrates a second set of example actions that may be performed to provide security to the driver 140 of the vehicle 125. At block 505, a vehicle-based surveillance system in the vehicle 125 may be activated. In an example scenario, the vehicle-based surveillance system may be activated by the driver 140 via a GUI of the infotainment system 130. In another example scenario, the vehicle-based surveillance system may be activated by the driver 140 via the personal communication device 155 of the driver 140 or may be activated via a personal communication device of another individual (a parent of the driver 140, for example). In yet another example scenario, the vehicle-based surveillance system may be automatically activated whenever the vehicle 125 is started.

At block 510, a computer in a police vehicle that is in the vicinity of the vehicle 125 receives a notification from the security computer 150 of the vehicle 125 that the vehicle-based surveillance system has been activated. The computer in the police vehicle may also receive such notifications from other vehicle security computers that are conducting vehicle-based surveillance in other vehicles in the vicinity. The notification from the security computer 150 may prompt a police officer in the police vehicle to be on the alert for any request for help from the vehicle 125.

At block 515, a determination is made whether a request for help has been received from the vehicle 125 (through the security computer 150 of the vehicle 125 and/or from the personal communication device 155 of the driver 140 of the vehicle 125). If no request has been received, the police officer in the police vehicle may continue to be on alert for any request for help.

If a request for help is received, at block 520, for example, from the security computer 150 of the vehicle 125, a computer in a police vehicle may alert the police officer in the police vehicle of the help request. The police officer may respond to the help request in various ways, such as, for example, by performing a "welfare check" upon the driver 140 of the vehicle 125 and/or by interacting with the driver of the vehicle 205. The welfare check may also be made at other times, such as, for example, when the police officer notices the vehicle 205 following the vehicle 125 for an extended period of time even if the driver 140 is unaware of the actions of the vehicle 205.

Figure 6:
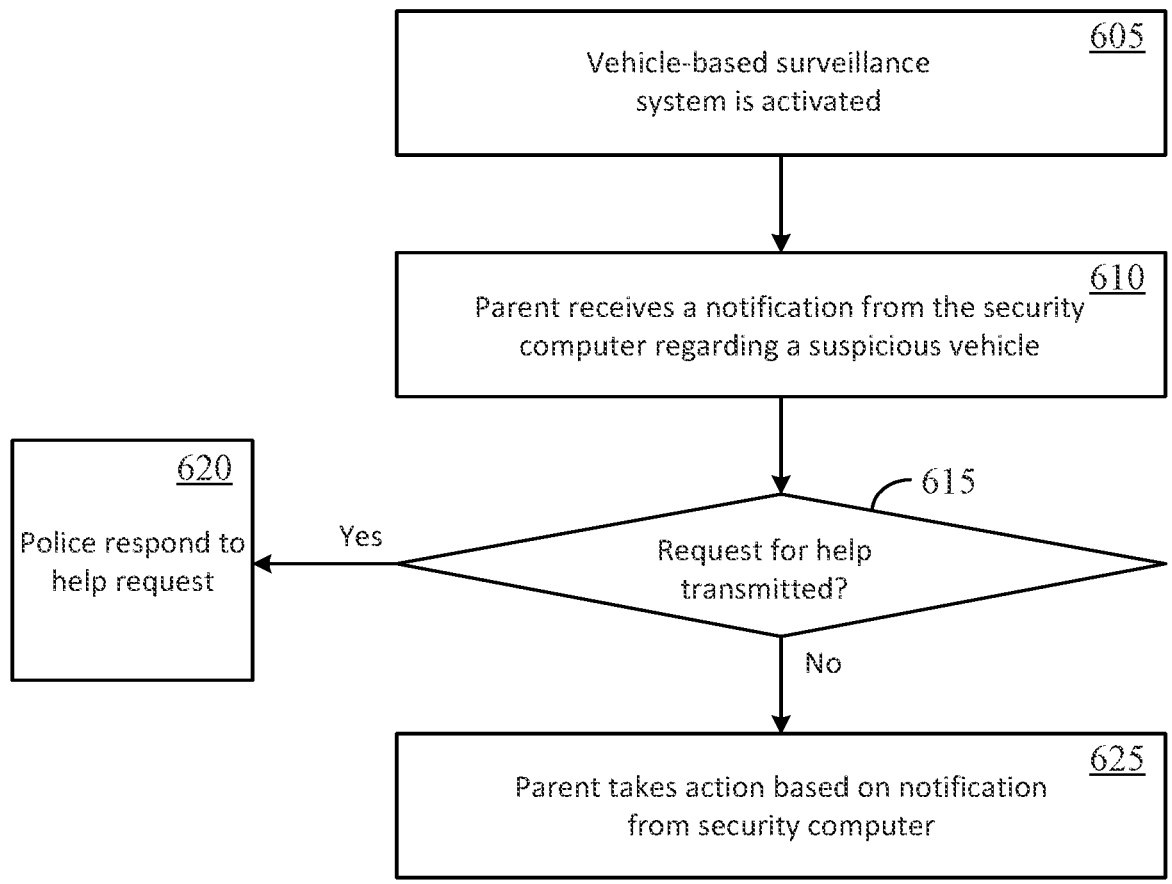
FIG. 6 illustrates a third set of example actions that may be performed to provide security to a driver of a vehicle in accordance with an embodiment of the disclosure.

FIG. 6 illustrates a third set of example actions that may be performed to provide security to the driver 140 of the vehicle 125. In an example scenario, the driver 140 is a teenager. At block 605, a vehicle-based surveillance system in the vehicle 125 may be activated. The vehicle-based surveillance system may be activated in various ways such as, for example, by the teenager via a GUI of the infotainment system 130, by the teenager via the personal communication device 155 of the teenager, or via a personal communication device of another individual (a parent of the teenager, for example). In yet another example scenario, the vehicle-based surveillance system may be automatically activated whenever the vehicle 125 is started.

At block 610, a parent of the teenager receives a notification from the security computer 150 of the vehicle 125 that a suspicious looking vehicle appears to be stalking the vehicle 125. The teenager may, or may not, be aware of the notification having been sent out to the parent.

At block 615, a determination may be made whether the security computer 150 of the vehicle 105 has already transmitted a request for help to the police. The notification provided to the parent (at block 610) may include information whether the police have been contacted. If the police have been contacted, at block 620, the police may respond to the request by providing advice to the teenager and/or by dispatching a police vehicle to rendezvous with the vehicle 125.

If the police have not been contacted, at block 625, the parent may take action based on the notification. For example, the parent may contact the teenager via phone and seek clarification about the other vehicle 205 (such as, for example, to find out if the vehicle 205 is being driven by a friend of the teenager) and/or to alert the teenager.

Figure 7:
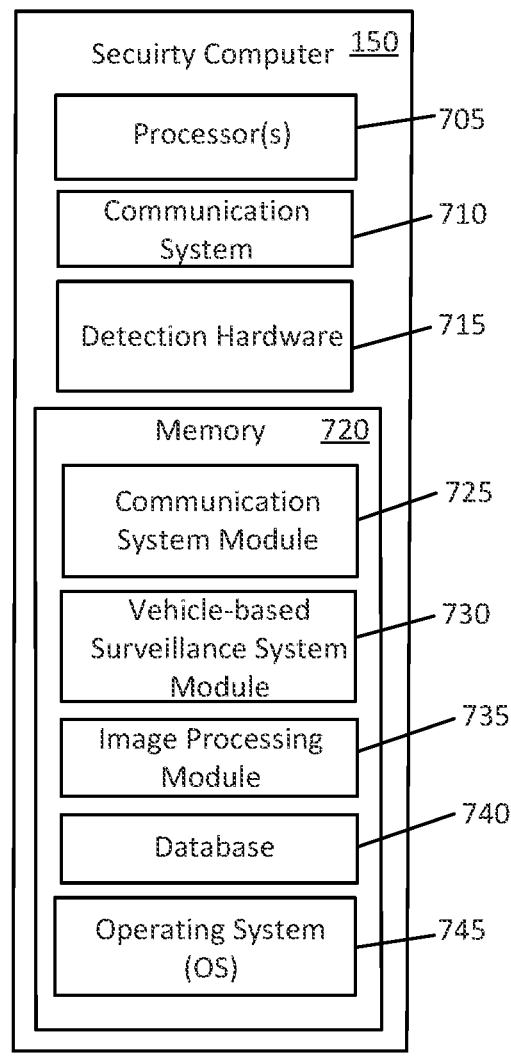
FIG. 7 shows some example components that may be included in a security computer provided in the first vehicle in accordance with an embodiment of the disclosure.

FIG. 7 shows some example components that may be included in the security computer 150 provided in the vehicle 125 in accordance with an embodiment of the disclosure. The security computer 150, which can be a part of a vehicle-based security system may include a processor 705, a communication system 710, detection hardware 715, and a memory 720. The communication system 710 can include a wireless transceiver that allows the security computer 150 to communicate with various devices such as the computer 117 in the police agency, the computer 106 in the records agency, and the computer 210 in the vehicle 205.

The wireless transceiver of the communication system 710 may use any of various communication formats such as, for example, vehicle-to-vehicle (V2V) communication format, a vehicle-to-everything (V2X) communication format, an Internet communications format, or a cellular communications format for communicating with the computer 117 in the police agency, the computer 106 in the records agency, the computer 210 in the vehicle 205, and/or the personal communication device 155 of the driver 140.

The wireless transceiver of the communication system 710 may also use one or more of various wireless technologies such as Bluetooth®, Ultra-Wideband (UWB), Wi-Fi, ZigBee®, Li-Fi (light-based communication), audible communication, ultrasonic communication, or near-field-communications (NFC), for carrying out wireless communications with devices such as the personal communication device 155 of the driver 140 and/or the infotainment system 130 of the vehicle 125.

The communication system 710 may also include circuitry for receiving information (signals, images, etc.) from various devices in the vehicle 125, such as, for example, the camera 135, the camera 160, and/or the ultrasonic sensor 165.

The memory 720, which is one example of a non-transitory computer-readable medium, may be used to store an operating system (OS) 745, a database 740, and code modules such as a communication system module 725, a vehicle-based surveillance system module 730, and an image processing module 735. The code modules are provided in the form of computer-executable instructions that can be executed by the processor 705 for performing various operations in accordance with the disclosure.

The communication system module 725 may include computer-executable instructions to configure the communication system 710 to communicate with various elements such as, for example, the computer 117 in the police agency, the computer 106 in the records agency, the computer 210 in the vehicle 205, the personal communication device 155 of the driver 140, and the various detector devices such as the camera 135, the camera 160, and the ultrasonic sensor 165.

The database 740 may be used to store various types of information such as, for example, information about various vehicles and various individuals. The vehicles and/or individuals may be tagged in various ways, such as, for example, as friendly, suspicious, unknown, or as posing a security risk (ex-spouse, jealous colleague, hostile neighbor, etc.).

The vehicle-based surveillance system module 730 can enable the security computer 150 to carry out various actions described herein with providing security to occupants of the vehicle 125. Some example actions may include defining a dynamic geofence around the vehicle 125 and executing some of the method steps described above. As a part of executing the method steps, the vehicle-based surveillance system module 730 may access information stored in the database 740 and may cooperate with the communication system 710 and/or the detection hardware 715 for obtaining and analyzing images or video clips of the vehicle 205 following the vehicle 125.

In some embodiments, the vehicle-based surveillance system module 730 may utilize the image processing module 735 to process images that are provided to the security computer 150 by the camera 135 and/or the camera 160. Various image processing techniques may be used such as, for example, an image processing algorithm modeled on a neural network that is trained to analyze images of the vehicle 205 at various times and to determine a pattern of travel of the vehicle 205 and/or a behavioral pattern of the vehicle 205.

In some embodiments, reference images stored in the database 740 and/or fetched from device such as the computer 106 of the records agency 105 and/or the computer 117 of the police station 115 may be used by the image processing module 735 for identifying the vehicle 205 and to analyze actions performed by the vehicle 205.

In some embodiments, distance parameters may be used by the image processing module 735 for defining a dynamic geofence around the vehicle 125 and to keep the dynamic geofence attached to the vehicle 125. The distance parameters may be obtained by the security computer 150 for example, from devices such as the ultrasonic sensor 165 or other sensors that provide distance information, particularly separation distance information between the vehicle 125 and vehicles such as the vehicle 205.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 720, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

It should be noted that the sensor embodiments discussed above may comprise computer hardware, software, firmware, or any combination thereof to perform at least a portion of their functions. For example, a sensor may include computer code configured to be executed in one or more processors and may include hardware logic/electrical circuitry controlled by the computer code. These example devices are provided herein for purposes of illustration and are not intended to be limiting. Embodiments of the present disclosure may be implemented in further types of devices, as would be known to persons skilled in the relevant art(s).

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such condi- That which is claimed is:

1. A method comprising:
   establishing, by a first vehicle, a geofence around the first vehicle;
   detecting, by the first vehicle, a second vehicle present inside the geofence;
   obtaining, by the first vehicle, data comprising an identity of the second vehicle;
   evaluating, by the first vehicle, the identity of the second vehicle to detect a security threat posed by a driver of the second vehicle;
   detecting, by the first vehicle, that the second vehicle is following the first vehicle along a first travel route over a first period of time;
   modifying, by the first vehicle, the first travel route to a second travel route;
   detecting, by the first vehicle, that the second vehicle is following the first vehicle along the second travel route over a second period of time; and
   confirming, by the first vehicle, a stalking operation of the first vehicle by the second vehicle, based on detecting the second vehicle following the first vehicle along the first travel route over the first period of time and following the first vehicle along the second travel route over the second period of time.

2. The method of claim 1, wherein obtaining data comprising the identity of the second vehicle is based on vehicle-to-vehicle communications between the first vehicle and the second vehicle and/or on wireless communication between the first vehicle and a records agency.

3. The method of claim 1, further comprising:
   confirming, by the first vehicle, a stalking operation of the first vehicle by the second vehicle based on evaluating a pattern of travel of the second vehicle with respect to the first vehicle.

4. The method of claim 1, further comprising:
   transmitting, by the first vehicle, to a police officer, a video stream captured by a video camera provided in the first vehicle, the video stream comprising images of the second vehicle performing the stalking operation.

5. The method of claim 1, wherein the geofence is a dynamic geofence that is centered upon the first vehicle and moves with the first vehicle.

6. The method of claim 5, further comprising:
   confirming, by the first vehicle, a stalking operation of the first vehicle by the second vehicle based on detecting the second vehicle inside the geofence at a first location at a first instant in time along a travel route of the first vehicle and at a second location at a second instant in time along the travel route of the first vehicle.

7. A system comprising:
   a first computer located in a first vehicle, the first computer comprising:
      a memory that stores computer-executable instructions; and
      a processor configured to access the memory and execute the computer-executable instructions to perform operations comprising:
         establishing a geofence around the first vehicle, wherein the geofence is a dynamic geofence that is centered upon the first vehicle and moves with the first vehicle;
         modifying a size of the geofence based on an input provided by an occupant of the first vehicle;
         detecting a second vehicle present inside the geofence;
         obtaining data comprising an identity of the second vehicle; and
         evaluating the identity of the second vehicle to detect a security threat posed by the second vehicle.

8. The system of claim 7, wherein the processor is further configured to access the memory and execute additional computer-executable instructions to perform operations comprising:
   confirming a stalking operation of the first vehicle by the second vehicle based on detecting the second vehicle inside the geofence at a first location at a first instant in time along a travel route of the first vehicle and at a second location at a second instant in time along the travel route of the first vehicle.

9. The system of claim 8, wherein the first vehicle further includes an image capture system configured to capture a digital image and/or generate a video stream of the second vehicle, and wherein detecting the second vehicle comprises evaluating the digital image and/or the video stream of the second vehicle to detect the second vehicle.

10. The system of claim 8, wherein the first vehicle further includes:
    a camera configured to capture an image of the second vehicle; and
    a communication system configured to wirelessly transmit the image to a police officer.

* * * * *